United States Patent
Kaiser

(10) Patent No.: US 7,482,785 B2
(45) Date of Patent: Jan. 27, 2009

(54) TRANSPONDER WITH OSCILLATOR PEAK VOLTAGE LIMIT

(75) Inventor: Ulrich Kaiser, Warstein (DE)

(73) Assignee: Texas Instruments Incorporated, Dallas, TX (US)

( * ) Notice: Subject to any disclaimer, the term of this patent is extended or adjusted under 35 U.S.C. 154(b) by 383 days.

(21) Appl. No.: 10/965,457

(22) Filed: Oct. 13, 2004

(65) Prior Publication Data
US 2005/0134234 A1 Jun. 23, 2005

(30) Foreign Application Priority Data
Oct. 17, 2003 (DE) ................................ 103 48 340

(51) Int. Cl.
*H01M 10/46* (2006.01)
(52) U.S. Cl. .................................................. 320/166
(58) Field of Classification Search ................. 320/108, 320/141, 166
See application file for complete search history.

(56) References Cited
U.S. PATENT DOCUMENTS

2002/0050861 A1* 5/2002 Nguyen et al. ............... 330/254
2003/0128071 A1* 7/2003 Nguyen et al. ............... 330/254

* cited by examiner

*Primary Examiner*—Edward H Tso
(74) *Attorney, Agent, or Firm*—J. Dennis Moore; W. James Brady, III; Frederick J. Telecky, Jr.

(57) ABSTRACT

A transponder device having an LC oscillator circuit, an energy storage capacitor and an integrated transponder circuit powered by energy from the storage capacitor. The device operates either in a charge mode in which RF energy is received through the LC oscillator circuit and stored in the energy storage capacitor, or in a transmit mode in which data from the transponder circuit are transmitted from the transponder device through the LC oscillator circuit by sustaining oscillation of the LC oscillation circuit and selectively modulating the oscillator frequency. The device further includes a stimulating circuit to feed energy from the storage capacitor into the LC oscillator circuit during the transmit mode and to sustain oscillation thereof, a peak detector for detecting a peak voltage level of an RF oscillator signal in the LC oscillator circuit and a pulse generator for providing trigger pulses to the stimulating circuit in response to an output from the peak detector. The stimulating circuit is controlled in a manner to prevent the amplitude of the oscillator signal in the LC oscillator circuit from exceeding a predetermined peak value, by suppressing a stimulating pulse when the oscillator signal gets close to the predetermined peak value.

11 Claims, 1 Drawing Sheet

TRANSPONDER WITH OSCILLATOR PEAK VOLTAGE LIMIT

TECHNICAL FIELD OF THE INVENTION

The present invention relates to a transponder device with an LC oscillator circuit, an energy storage capacitor and an integrated transponder circuit powered by energy from the storage capacitor.

BACKGROUND OF THE INVENTION

A low-power transponder device for use in identification systems is disclosed in IEEE Journal of Solid-State Circuits, Vol. 30, No. 3, March 1995, pages 306-310, "A Low-Power Transponder IC for High Performance Identification Systems" by Ulrich Kaiser and Wolfgang Steinhagen. In such a transponder device, the LC oscillator circuit is used as an RF interface to receive energy from a reader unit and to send data back to the reader unit. The reading unit sends signal bursts at the resonant frequency of the transponder's LC oscillator circuit. In the transponder device, the RF signal inductively received through the LC oscillator circuit is rectified and fed to a storage capacitor. Reception of RF energy is recognized in the device with an end-of-burst (EOB) detector. The output of the EOB detector determines the mode of operation of the transponder device. When RF energy is received, the device is operated in a charge mode and energy is stored in the storage capacitor CL. When the transmission of RF energy ends, this is detected by the EOB detector, and the device is switched to a transmit mode. In the transmit mode, oscillation of the LC oscillator circuit is sustained by applying stimulating pulses to the circuit with an appropriate timing, intensity and phase. The stimulating pulses are also referred to as "plucking pulses". Frequency shift keying (FSK) is typically used to transmit data from the transponder device to the reader unit. To change the frequency of the oscillator signal, a small capacitor is selectively connected across the terminals of the LC circuit. In such a transponder device, the energy needed to transmit data from the device to the reader unit is entirely taken from the storage capacitor so that the device may be battery-less.

The stimulating pulses are provided by a pulse generator in response to the output from a peak detector connected to the LC oscillator circuit. Since the LC circuit usually has one terminal connected to the storing capacitor and another terminal connected to ground through a rectifier diode, the peak detector should detect the minimum peak voltage of the oscillator signal. A switching transistor momentarily connects the node between the LC circuit and the rectifier diode to ground in response to each stimulating (or plucking) pulse received from the pulse generator.

Depending on the Q-factor of the LC circuit, the stimulating pulses are needed more or less frequently. For example, at a Q of 100, a pulse is needed every $8^{th}$ period of the oscillator signal; at a Q of 50, a pulse may be needed every $4^{th}$ period of the oscillator signal.

At Q-factors as low as 10 to 30, the stimulating pulses must be provided even more frequently. It has now been found that over-stimulation may occur under these circumstances. As used here, "over-stimulation" means that the negative peak voltage of the oscillator signal exceeds a level at which the EOB detector reacts, thereby attempting to switch the device from the transmit mode to the charge mode. This causes corruption of the data that are in the process of being transmitted from the device to the reader unit.

SUMMARY OF THE INVENTION

The present invention addresses this problem. Specifically, the invention provides a transponder device of the above-disclosed kind wherein the stimulating circuit is controlled in a manner to prevent the amplitude of the oscillator signal in the LC oscillator circuit from exceeding a predetermined peak value. By keeping the peak amplitude of the oscillator signal below the threshold at which the end-of-burst detector reacts, corruption of data in the course of data transmission is effectively avoided.

In a preferred embodiment, the stimulating circuit comprises a switching transistor selectively connecting a first node of the LC oscillator circuit to a reference node at a reference voltage level in response to trigger pulses from a pulse generator. The stimulating circuit further comprises a circuit arrangement for suppressing the trigger pulses when the amplitude of the oscillator signal reaches the predetermined peak value. The circuit arrangement may comprise a supply capacitor with a first terminal connected to the reference node and a second terminal charged to a supply voltage and connected to a supply node, and a complementary field effect transistor pair connected in series between the supply node and the reference node, the gates of the transistor pair being connected to the first node of the LC oscillator circuit and an interconnection node between the transistor pair providing an output signal that selectively enables or disables the switching transistor.

A further measure to reduce the risk of an over-stimulation is to insert a negative feedback resistor in the drain connection of the switching transistor, thereby achieving a self-adjustment of the stimulating action.

Except for a few components such as the LC oscillator circuit and the storage capacitor, the entire device is preferably incorporated in an integrated CMOS device.

These and other aspects and features of the invention will be apparent to those skilled in the art from the following detailed description of the invention, taken together with the accompanying drawings.

DETAILED DESCRIPTION OF THE PREFERRED EMBODIMENT

Figure 1:
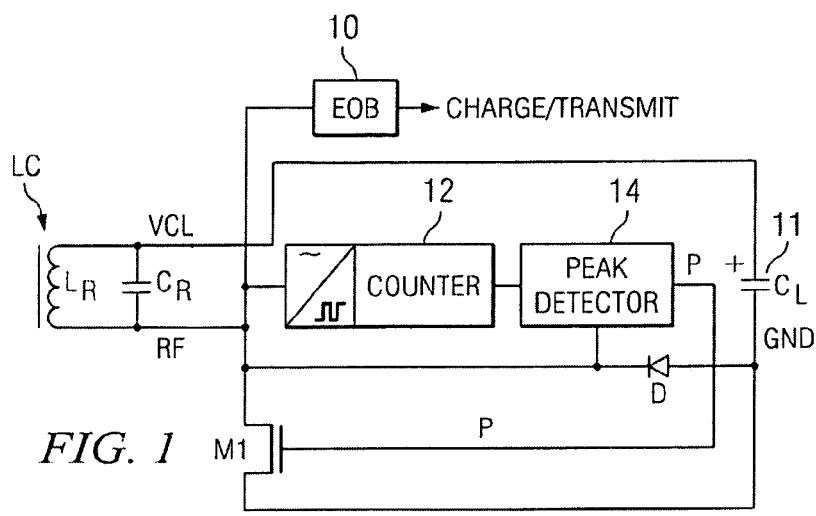
FIG. 1 is a block diagram of basic components in a transponder device.

Among the basic components of a transponder device, as seen in FIG. 1, are an LC oscillator circuit comprising a coil $L_R$ and a capacitor $C_R$ connected in parallel with the coil, a storage capacitor $C_L$ and an integrated CMOS circuit that includes an end-of-burst detector 10, a frequency divider 12 with clock generator, a peak detector 14, a substrate diode D and an n-channel transistor M1. The storage capacitor $C_L$ has one electrode connected to ground and another electrode directly connected to a first terminal of the LC oscillator circuit, referred to as voltage level VCL. Transistor M1 has its current path connected between ground and the second terminal of the LC oscillator circuit, referred to as RF. Diode D is also connected between ground and terminal RF. Frequency divider 12 is a counter that has its clock regenerator input connected to terminal RF and an output connected to a first input of peak detector 14. A second input of peak detector 14 is connected to terminal RF and the output of peak detector 14 is connected to the gate of transistor M1. The end-of-burst detector 10 has an input connected to terminal RF and an output connected to other control logic (not shown) of the transponder device.

Except for the LC oscillator circuit and storage capacitor 11 all components shown are incorporated with other circuit components in an integrated CMOS device. Diode D is the substrate diode of the CMOS device.

In operation, RF bursts are received inductively by the LC circuit from a reader unit (not shown) and the output of the end-of-burst detector 10 switches the device into the charge mode. In the charge mode, the RF signal from the LC circuit terminal RF is rectified by diode D and energy is charged into storage capacitor $C_L$. At the termination of an RF burst, the output of the end-of-burst detector 10 changes to switch the device to the transmit mode. In the transmit mode, the LC circuit is "plucked" to sustain its oscillation by momentarily switching ON transistor M1 and thus connecting terminal RF to ground. This transfers a small amount of energy from $C_L$ to the LC circuit. To transmit data from the transponder device to the reader unit, the frequency of the LC circuit is switched between two different values by selectively connecting a small capacitor (not shown) in parallel with capacitor $C_R$. The timing of the "plucking" pulses is determined by the combined action of frequency divider 12 and peak detector 14.

Figure 3:
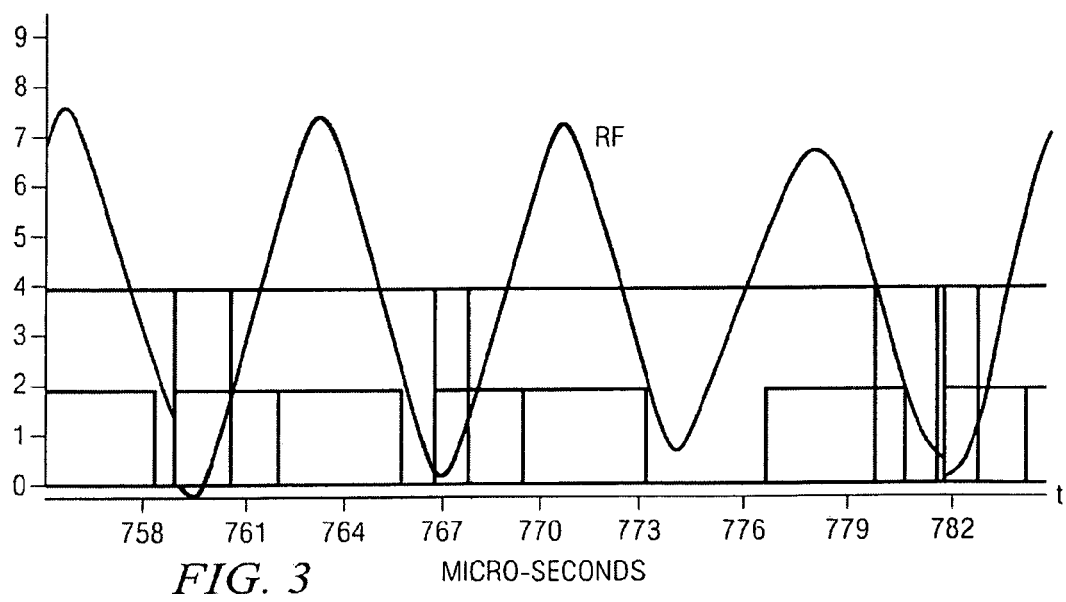
FIG. 3 is a chart illustrating an over-stimulation phenomenon.

FIG. 3 shows the effect of an excessive "plucking" (or stimulating) pulse observed at the time t=759 µs. It is seen that the amplitude of the signal momentarily falls below ground level. As a consequence, at the time t=780, the output of the end-of-burst detector 10 changes, the device is switched from transmit to charge mode and the transmission of data from the transponder device to the reader unit is stopped. Therefore, the remaining data bits are not sent and the data protocol is corrupted.

Figure 2:
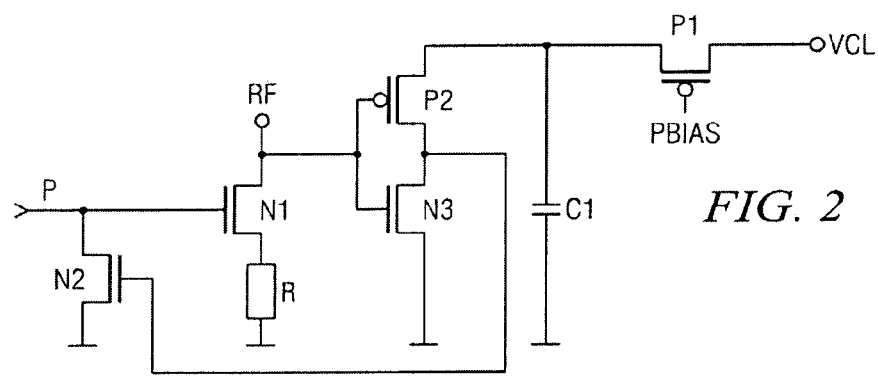
FIG. 2 is a diagram of a circuit arrangement that selectively disables a switching transistor in the device of FIG. 1.

This problem is addressed by the "plucking" control circuit shown in FIG. 2. With reference to FIG. 2, transistor M1 in FIG. 1 is replaced by a series connection of an n-channel transistor N1 and a feedback resistor R. The current path of another n-channel transistor N2 is connected between ground and the gate of transistor N1. A zero-level detector comprising series connected n-channel and p-channel transistors N3 and P2 has an output connected to the gate of transistor N2 and an input connected to terminal RF. Energy for operating the zero-level detector at all events is taken from a supply capacitor C1 connected to terminal VCL by p-channel transistor P1 which acts as a current source. Transistors N3 and P2 are connected as an inverter. In the preferred embodiment, transistor N3 has a low threshold voltage of about 0.3 Volt, whereas transistor P2 has a normal threshold voltage of about 0.7 Volt.

In operation, as long as the voltage level at terminal RF is positive with respect to ground, the output of the inverter formed by transistors N3 and P2 remains low, transistor N2 is blocked and trigger pulses P are supplied from peak detector 14 to the gate of transistor N1. When the voltage level at terminal RF gets close to zero, the output of the inverter formed by transistors N3 and P2 switches from low to high, transistor N2 is ON and the trigger pulses P are shorted in time or even eliminated. As a consequence, a "plucking" pulse is eliminated and "overplucking" is avoided. The end-of-burst detector 10 is prevented from changing state and the transmission of data is continued. In addition, the feedback resistor R prevents transistor N1 from conducting an excessively high "plucking" current by automatically reducing the gate-source voltage in response to drain-source current.

Although the present invention and its advantages have been described in detail, it should be understood that various changes, substitutions and alterations can be made herein without departing from the spirit and scope of the invention as defined by the appended claims. For example, the present invention is described above with reference to a p-substrate CMOS technology. If an n-substrate CMOS is used, VCL becomes negative, ground becomes positive, all n-channel transistors are replaced by p-channel transistors, and vice versa.

What is claimed is:

1. A transponder device with an LC oscillator circuit, an energy storage capacitor and an integrated transponder circuit powered by energy from the storage capacitor, the device being adapted to operate either in a charge mode in which RF energy is received through the LC oscillator circuit and stored in the energy storage capacitor, or in a transmit mode in which data from the transponder circuit are transmitted from the transponder device through the LC oscillator circuit by sustaining oscillation of the LC oscillation circuit and selectively modulating the oscillator frequency; comprising:
   a stimulating circuit feeding energy from the storage capacitor into the LC oscillator circuit during the transmit mode to sustain oscillation thereof;
   a peak detector for detecting a peak voltage level of an RF oscillator signal in the LC oscillator circuit;
   a pulse generator for providing trigger pulses to the stimulating circuit in response to an output from the peak detector; and
   a control circuit for controlling the stimulating circuit to prevent the amplitude of the oscillator signal in the LC oscillator circuit from exceeding a predetermined peak value.

2. The transponder device of claim 1, wherein the predetermined peak value is close to a reference voltage level.

3. The transponder device of claim 2, wherein the reference voltage level is ground level.

4. The transponder device of claim 1, wherein the stimulating circuit comprises a switching transistor selectively connecting a first node of the LC oscillator circuit to a reference node at the reference voltage level in response to the trigger pulses from the pulse generator.

5. The transponder device of claim 4, wherein the energy storage capacitor is connected across the reference node and a second node of the LC oscillator circuit, and a diode is connected between the first node of the LC oscillator circuit and the reference node.

6. The transponder device of claim 5, wherein the integrated transponder circuit is a CMOS circuit and the diode is a substrate diode.

7. The transponder device of claim 4, wherein the control circuit comprises circuit means for suppressing the trigger pulses when the amplitude of the oscillator signal reaches the predetermined peak value.

8. The transponder device of claim 7, wherein the circuit means comprises a supply capacitor with a first terminal connected to the reference node and a second terminal charged to a supply voltage and connected to a supply node, and a complementary field effect transistor pair connected in series between the supply node and the reference node, the gates of the transistor pair being connected to the first node of the LC oscillator circuit and an interconnection node between the transistor pair providing an output signal that selectively enables or disables the switching transistor.

9. The transponder device of claim 8, wherein the second terminal of the supply capacitor is connected to the second node of the LC oscillator circuit through a current source.

10. The transponder device of claim 8, wherein the transistor of the field effect transistor pair that has a source connected to the reference node has a threshold voltage substantially smaller than the transistor of the field effect transistor pair that has a source connected to the supply node.

11. The transponder device of claim 4, wherein the switching transistor is provided with a negative feedback resistor in its current path.

* * * * *